United States Patent
Monjas Llorente et al.

(10) Patent No.: US 9,396,466 B2
(45) Date of Patent: Jul. 19, 2016

(54) ACCOUNT LINKAGE IN MACHINE-TO-MACHINE SCENARIOS

(75) Inventors: Miguel Angel Monjas Llorente, Madrid (ES); Carolina Canales Valenzuela, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

(21) Appl. No.: 14/113,556

(22) PCT Filed: Apr. 28, 2011

(86) PCT No.: PCT/EP2011/056758
§ 371 (c)(1),
(2), (4) Date: Oct. 23, 2013

(87) PCT Pub. No.: WO2012/146289
PCT Pub. Date: Nov. 1, 2012

(65) Prior Publication Data
US 2014/0045454 A1  Feb. 13, 2014

(51) Int. Cl.
*G06Q 20/32* (2012.01)
*G06Q 20/02* (2012.01)
*G06F 21/31* (2013.01)
(Continued)

(52) U.S. Cl.
CPC ............. *G06Q 20/32* (2013.01); *G06F 21/31* (2013.01); *G06Q 20/02* (2013.01); *H04L 63/0853* (2013.01); *H04W 4/005* (2013.01); *H04W 12/06* (2013.01)

(58) Field of Classification Search
None
See application file for complete search history.

(56) References Cited

U.S. PATENT DOCUMENTS 7,433,710 B2 * 10/2008 Bodnar ............... G06Q 30/02
  348/207.1
7,551,913 B1 * 6/2009 Chien ................. G06Q 20/383
  380/247

(Continued)

FOREIGN PATENT DOCUMENTS

CN  1456998 A  11/2003
CN  1691576 A  11/2005

OTHER PUBLICATIONS

English Translation of Chinese Search Report and Official Action dated Aug. 26, 2015, for Chinese Serial No. 201180070453.6 filed Apr. 28, 2011 and Chinese language copy of Chinese Search Report and Official Action, consisting of 34 pages.

(Continued)

*Primary Examiner* — Calvin L Hewitt, II
*Assistant Examiner* — Eduardo Castilho
(74) *Attorney, Agent, or Firm* — Christopher & Weisberg, P.A.

(57) ABSTRACT

Upon a user switching-on an appliance with an appliance SIM card of a home telecommunication network, the appliance attaches to the home telecommunication network. The user sets the appliance for association of the user with the appliance. The appliance requests a token to the home telecommunication network. The request includes an appliance identifier of the card. An Identity Linking Function server of the home telecommunication network generates the token, associates the token and the appliance identifier of the card, and provides the token. The user registers a user name and password. The appliance media site server creates a user account for the user with the user name and password. The user submits an identifier of the home telecommunication network, and the appliance media site server redirects the user towards the home telecommunication network with information for further return.

25 Claims, 8 Drawing Sheets

(51) Int. Cl.
*H04W 4/00* (2009.01)
*H04L 29/06* (2006.01)
*H04W 12/06* (2009.01)

(56) References Cited

U.S. PATENT DOCUMENTS

| | | | | |
|---|---|---|---|---|
| 7,689,007 | B2* | 3/2010 | Bous | G06Q 20/383 382/115 |
| 8,621,571 | B2* | 12/2013 | Lee | H04L 67/303 370/329 |
| 2002/0026575 | A1* | 2/2002 | Wheeler | G06Q 20/00 713/156 |
| 2003/0051041 | A1* | 3/2003 | Kalavade | G06Q 20/14 709/229 |
| 2003/0061503 | A1* | 3/2003 | Katz | H04L 29/06 726/4 |
| 2003/0097573 | A1* | 5/2003 | Wheeler | G06Q 20/403 713/182 |
| 2003/0172090 | A1* | 9/2003 | Asunmaa | G06F 21/31 |
| 2004/0215788 | A1* | 10/2004 | Morris | G06Q 10/00 709/227 |
| 2007/0162502 | A1* | 7/2007 | Thomas | G06F 17/3082 |
| 2007/0224969 | A1* | 9/2007 | Rao | H04W 12/06 455/411 |
| 2007/0260544 | A1* | 11/2007 | Wankmueller | G06Q 20/40 705/44 |
| 2008/0216153 | A1* | 9/2008 | Aaltonen | G06F 21/31 726/3 |
| 2008/0287100 | A1* | 11/2008 | Satheesh | H04M 3/02 455/411 |
| 2008/0293379 | A1* | 11/2008 | Hinton | H04L 63/0414 455/411 |
| 2009/0191857 | A1* | 7/2009 | Horn | H04W 4/00 455/419 |
| 2009/0217348 | A1* | 8/2009 | Salmela | H04L 63/08 726/2 |
| 2009/0279682 | A1* | 11/2009 | Strandell | H04L 63/18 379/201.02 |
| 2010/0100945 | A1* | 4/2010 | Ozzie | G06F 21/35 726/5 |
| 2010/0191633 | A1* | 7/2010 | Nuzum | G06Q 20/10 705/35 |
| 2010/0293065 | A1* | 11/2010 | Brody | G06Q 20/16 705/26.1 |
| 2010/0325441 | A1* | 12/2010 | Laurie | G06F 21/31 713/185 |
| 2011/0035319 | A1* | 2/2011 | Brand | G06Q 20/40 705/44 |
| 2011/0047598 | A1* | 2/2011 | Lindley | G06F 21/6245 726/4 |
| 2011/0098030 | A1* | 4/2011 | Luoma | H04M 3/42153 455/419 |
| 2011/0117881 | A1* | 5/2011 | Luoma | G06F 3/048 455/410 |
| 2011/0154447 | A1* | 6/2011 | Dennis | G06F 21/35 726/4 |
| 2011/0209202 | A1* | 8/2011 | Otranen | H04L 63/08 726/4 |
| 2011/0225640 | A1* | 9/2011 | Ganapathy | H04W 12/06 726/8 |
| 2011/0277002 | A1* | 11/2011 | Xiong | H04L 63/0807 725/104 |
| 2011/0281551 | A1* | 11/2011 | Gonzalez | H04M 15/00 455/406 |
| 2011/0287739 | A1* | 11/2011 | Cajigas Bringas | H04L 63/18 455/410 |
| 2011/0319056 | A1* | 12/2011 | Toy | H04W 12/06 455/412.2 |
| 2013/0012168 | A1* | 1/2013 | Rajadurai | H04L 9/0822 455/411 |
| 2013/0150000 | A1* | 6/2013 | Wong | H04W 12/06 455/411 |

OTHER PUBLICATIONS

International Search Report dated Jan. 19, 2012 for International Application No. PCT/EP2011/056758, International Filing Date: Apr. 28, 2011 consisting of 3-pages.

NPL_3GPP TS 33.220 V10.0.0 (Oct. 2010) Technical Specification Group Services and System Aspects Generic Authentication Architecture (GAA): Generic Bootstrapping Architecture (Release 10) dated Oct. 8, 2010 consisting of 75-pages.

N. Ragouzis, et al., "Oasis Security Assertion Markup Language (SAML) V2.0 Technical Overview" Committee Draft 02 dated Mar. 25, 2008 downloaded from the Internet on Dec. 2, 2013 at http://docs.oasis-open.org/security/saml/Post2.0/sstc-saml-tech-overview-2.0-cd-02.html consisting of 48-pages.

* cited by examiner

ACCOUNT LINKAGE IN MACHINE-TO-MACHINE SCENARIOS

TECHNICAL FIELD

The present invention generally relates to Machine-to-Machine services. More specifically, the invention pertains to associations of Machine-to-Machine devices with users.

BACKGROUND

The so-called 'Machine to Machine' (hereinafter M2M) concept envisions a networked interconnection of common objects, which could be equipped with minuscule identifying devices, be interoperable and also be enabled to act independently, pursuing their own objectives or shared ones, and depending on context, circumstances or environments. In this respect, power meters, vehicles and even orange trees can be enabled to report their status over the network, and thus the M2M is expected to grow encompassing 16 billion connectable devices worldwide by year 2020.

A particular technical field within the M2M is the one known as "Connected Consumer Electronics" (CCE), which is mainly focusing on how electronic appliances intended for everyday use are connected and inter-work with users and other devices. These CCE devices, hereinafter appliances, are associated to a M2M connection which can be used to upload/download information to/from network-hosted sites, sometimes operated by telecommunication operators and some times by third parties. Exemplary CCE devices, namely appliances, may be photo cameras or media readers for uploading pictures from an ACME camera to the ACME Media Store, via an M2M connection.

New services are desirable in these scenarios where pluralities of appliances are enabled to connect with each other and to interoperate with telecommunication networks and third party sites. For example, in the above exemplary use case, a user owning the ACME camera might also be enabled to connect with the ACME Media Store by other means, such as via his/her PC, and might even want to charge the picture upload/download service to a billing account associated with another of his devices, such as his mobile phone, or vice verse.

At present, a user Bob may be represented by different identifiers which are respectively relevant for entities involved in particular domains. For example, the user Bob may be identified in the ACME Media Store by a username and password, whereas any appliance owned by Bob and equipped with a SIM card of the telecommunication network may be identified by an MSISDN.

Next generations of M2M-related architectures are expected to allow seamless interactions between multiple devices over multiple channels. However, conventional architectures nowadays still handle this variety of appliances, such as mobile phones, TV, sensors, cameras, etc, in silos. That is, interactions between appliances are still treated as occurring in different domains not interacting with each other.

As exploring appliances which can be more easily connected with each other, one can realize that those appliances equipped with a SIM card of a telecommunication network may more easily be associated with each other in said telecommunication network. To this end, the user should be given the possibility to choose one particular operator when purchasing the appliance and the seller should have the possibility to offer different choices to the user. Then, the association itself might be offered by the operators via provisioning systems. However, quite a few drawbacks exist for this quasi-manual procedure where human intervention is required. For example, there is a technical complexity since shops must have a connection with operators of the telecommunication network and such connection requires the management of network credentials. Apart from that, this solution does not solve the problem of associations at the ACME Media Store.

Moreover, the variety of appliances under consideration is not expected to have a powerful user interface but rather a limited one, at least, generally speaking. That is, a feasible solution should not come across an extensive user interaction through the appliance.

On the other hand, in the above situations, the user Bob would have to (re)-identify himself as "Bob" for every interaction through different appliances or devices, and could also need to authenticate from each of the appliances or devices. This could be complex for devices with a limited user interface, such as a camera might have.

There is thus a need for providing a consistent user experience independently on the appliance or device, and independently of the type of access, that Bob is making use of That is, "Bob" should always be "Bob" towards the ACME Media Store, and independently on whether it is Bob from his camera, Bob from his PC or Bob from his phone.

SUMMARY

The present invention is aimed to at least minimize the above drawback and provides for a method of associating an appliance with its user at respective appliance media site and home telecommunication network, as well as for an enhanced appliance, an enhanced appliance media site server "AMS server" and a new Identity Linking Function server, "ILF server", of the home telecommunication network.

In accordance with a first aspect of the present invention, there is provided a method of associating an appliance with its user at respective appliance media site and home telecommunication network.

This method comprises, upon a user switching-on an appliance with an appliance's SIM card of a home telecommunication network, the appliance attaching to the home telecommunication network; the user setting the appliance for association of the user with the appliance; the appliance requesting a token to the home telecommunication network for the association of the user with the appliance, the request including an appliance identifier of the appliance's SIM card; an Identity Linking Function server "ILF server" of the home telecommunication network generating the token, associating the token and the appliance identifier of the appliance's SIM card, and providing the token to the appliance.

In particular, the appliance identifier of the appliance's SIM card may be an IMSI, or MSISDN, or both, identifying the appliance; though it may also be any other appliance identifier obtainable or readable from the appliance's SIM card, that is, from the SIM card included in the appliance and for which an M2M subscription may be held in the home telecommunication network.

Also in particular, the method may further comprise a step of verifying at the ILF server whether the appliance identifier of the appliance's SIM card corresponds to a Machine-to-Machine "M2M" connection.

Once this token has been provided to the appliance, and presented to the user, the user can further use it in subsequent steps of this method. The method further comprises the steps of: the user accessing an appliance media site server, through a terminal equipment, and registering a user name and password to initiate a user's account in the appliance media site server; the appliance media site server creating a user's account for the user with the user name and password; the user submitting, through the terminal equipment, an identifier of the home telecommunication network to the appliance media site server, and the appliance media site server redirecting the user towards the home telecommunication network with information for further return.

Upon redirection to the home telecommunication network, the method further comprises the steps of: the user providing through the terminal equipment the token as user's identification; the Identity Linking Function server retrieving the appliance identifier of the appliance's SIM card associated with the token, and redirecting the user back to the appliance media site server with the retrieved appliance identifier of the appliance's SIM card; and the appliance media site server associating the appliance identifier of the appliance's SIM card with the user's account in the appliance media site server.

In a first embodiment of this method, the step of setting the appliance for association of the user with the appliance may be carried out by selecting a corresponding option by the user in a user interface unit of the appliance. That is, the user interface unit might present a sort of menu to the user with a selectable option intended for setting the appliance for association of the user with the appliance.

Complementary or alternatively to the first embodiment of this method, there is a second embodiment of this method, whereby the step of the user submitting the identifier of the home telecommunication network to the appliance media site server may be responsive to a step of the appliance media site server requesting the user to identify the home telecommunication network, upon detecting that there is no appliance associated with the user's account in the appliance media site server.

Alternatively to this second embodiment, and still complementary or alternatively to the first embodiment, the step of the user submitting the identifier of the home telecommunication network to the appliance media site server may be carried out along with the step of the user registering the user name and password to create a user's account in the appliance media site server. That might be the case where a user interface in the appliance media site server presents the user with three fields to fill in: the user name, the password and the identifier of the home network where the appliance has an M2M subscription.

Particularly useful in this method, and irrespective of whether the above first and second embodiments are implemented, the step of associating the token and the appliance identifier of the appliance's SIM card may include a step of storing the token and the appliance identifier of the appliance's SIM card in a storage accessible to the Identity Linking Function server, that is, a storage either locally included in the ILF server or an external storage or database accessible via any suitable protocol.

Complementary or alternatively to the above first embodiment and to the alternative second embodiments, there is provided a third embodiment wherein the step of generating the token at the ILF server may comprise a step of generating a time-stamp, and wherein the step of associating the token and the appliance identifier of the appliance's SIM card may comprise a step of associating the time-stamp with the token and the appliance identifier of the appliance's SIM card.

Particularly useful for this third embodiment in this method, the step of associating the token, the appliance identifier of the appliance's SIM card and the time stamp may comprise a step of storing the token, the appliance identifier of the appliance's SIM card and the time-stamp in a storage accessible to the ILF server wherein, as above commented, the accessible storage may be a storage either locally included in the ILF server or be an external storage or database accessible via any suitable protocol.

On the other hand, different advantages may be obtained from providing different embodiments regarding the life-time of the token. In this respect, there is provided a first token-related embodiment whereby, upon redirecting the user back to the appliance media site server there may be provided a further step of deleting the token and any association thereof from the Identity Linking Function server. An important advantage of deleting the token is the security: life-time of a token is as short as possible and only lasts the minimum time gap for allowing the provision of the appliance identifier of the appliance's SIM card towards the appliance media site server for association therein.

Alternatively to this first token-related embodiment, there is provided a second token-related embodiment whereby, upon expiry of the time-stamp generated in an embodiment discussed above, the method may further include a step of deleting the token and any association thereof from the Identity Linking Function server. This second token-related embodiment may provide comparable advantages as for the above first token-related embodiment though allows keeping the token alive for a longer period so as to allow the user to still make use of it without needs for generating a new token as further explained in respect of a still third token-related embodiment.

In fact, additional advantages and further services may be obtained by extending this method to further associate the appliance with a user's subscription also held in the home telecommunication network. Where this is the case, namely, where the method includes complementary steps to allow the user to associate the appliance with the user's subscription of the home telecommunication network, there may be provided an advantageous third token-related embodiment, whereby the token survives until the association of the appliance with the user's subscription of the home telecommunication network has been completed.

Nevertheless, the invention provides for extending this method to further allow associating the appliance with the user's subscription held in the home telecommunication network irrespective of whether the first, second or third token-related embodiment applies, so that the network operators can decide whether security reasons obtainable from the first or second token-related embodiments should prevail or the simple and soft workload of the third token-related embodiment should prevail.

Thus, where the third token-related embodiment applies and the token survives, the method may further include a step of the user submitting to the home telecommunications network, through a terminal equipment with a user's SIM card of the home telecommunication network, the token along with a request for association of the appliance with a user's subscription corresponding to the user's SIM card, the request including a user's identifier of the user's SIM card; and a step of the ILF server retrieving the appliance identifier of the appliance's SIM card associated with the token, associating the user's identifier of the user's SIM card with the appliance identifier of the appliance's SIM card, and confirming back to the user the association of the appliance and the user's subscription. In particular, the user's identifier of the user's SIM card may be an IMSI, MSISDN, or both user's identifiers obtainable or readable from the user's SIM card; although other identifiers obtainable or readable from the user's SIM card might also be possible for the purpose of the present invention.

However, where the token does not survive and either first or second token-related embodiments apply, there are provided a number of steps intended to generate a new token by the home telecommunication network to be used for associating the appliance with the user's subscription in the home telecommunication network. Where this is the case, the method further repeats the steps of: the user setting the appliance for association of the user with the appliance; the appliance requesting a token to the home telecommunication network for the association of the user with the appliance, the request including an appliance identifier of the appliance's SIM card; and the ILF server of the home telecommunication network generating the token, associating the token and the appliance identifier of the appliance's SIM card, and providing the token to the appliance.

Then, once the new token has been generated and presented to the user, the method may further comprise the steps of: the user submitting to the home telecommunications network, through a terminal equipment with a user's SIM card of the home telecommunication network, the token along with a request for association of the appliance with a user's subscription corresponding to the user's SIM card, the request including a user's identifier of the user's SIM card; and the Identity Linking Function server retrieving the appliance identifier of the appliance's SIM card associated with the token, associating the user's identifier of the user's SIM card with the appliance identifier of the appliance's SIM card, and confirming back to the user the association of the appliance and the user's subscription.

Once the appliance has been associated with the user's subscription in the home telecommunications network, the step of confirming back to the user the association of the appliance and the user's subscription may include a step of deleting the token and any association thereof from the ILF server.

Furthermore, where an additional service is offered to the user for payment through a billing account of the user in the home telecommunication network of any charging derived from the usage of the appliance, the method may be complemented with the steps of: the appliance media site server submitting a charging event with the appliance identifier of the appliance's SIM card towards the home telecommunication network; a billing function server of the home telecommunication network inquiring the ILF server about a user's subscription associated with the appliance identified by the appliance identifier of the appliance's SIM card; the ILF server retrieving the user's identifier of the user's SIM card associated with the appliance identifier of the appliance's SIM card and providing the user's identifier of the user's SIM card to the billing function server; and the billing function server charging a user's charging record for the user identified by the user's identifier of the user's SIM card with the charging event received from the appliance media site server.

In accordance with a second aspect of the invention, there is provided an Identity Linking Function server "ILF server" of a home telecommunication network for associating an appliance with its user at respective appliance media site and home telecommunication network.

This ILF server comprises: a receiver for receiving a request, which is originated from an appliance with an appliance's SIM card of the home telecommunication network, requesting a token for association of the user with the appliance, the request including an appliance identifier of the appliance's SIM card; a generator for generating the token; a processing unit for associating the token with the appliance identifier of the appliance's SIM card; a sender for providing the token to the appliance; wherein the receiver is arranged for receiving through a terminal equipment in use by the user the token as user's identification, along with information indicating a return redirection; the processing unit is arranged for retrieving the appliance identifier of the appliance's SIM card associated with the token; and the sender is arranged for using the information indicating the return redirection for redirecting the user with the retrieved appliance identifier of the appliance's SIM card towards the return redirection.

The ILF server may be configured to behave accordingly with the above token-related embodiments. That is, where the original token does not survive until the user sets the appliance for association with the user's subscription, a new token may be generated at the request of the appliance.

In particular, in this ILF server and for alignment purpose with the second token-related embodiment discussed above, the generator may be arranged for generating a time-stamp, and the processing unit may be arranged for associating the time-stamp with the token and the appliance identifier of the appliance's SIM card.

On the other hand, where the original token survives, the association of the appliance with the user's subscription may be triggered without requesting a new token.

In order to carry out the association of the appliance with the user's subscription in this ILF server, the receiver may be arranged for receiving the token from the user, through a terminal equipment with a user's SIM card of the home telecommunication network, along with a request for association of the appliance with a user's subscription corresponding to the user's SIM card, the request including a user's identifier of the user's SIM card; the processing unit may be arranged for retrieving the appliance identifier of the appliance's SIM card associated with the token and for associating the user's identifier of the user's SIM card with the appliance identifier of the appliance's SIM card; and, if an acknowledge is required, the sender may be arranged for confirming back to the user the association of the appliance and the user's subscription.

Advantageously, this ILF server may comprise storage for storing the token and the appliance identifier of the appliance's SIM card; and, where the optional time-stamp has been generated, this storage may be adapted to also store the time-stamp associated with the token and the appliance identifier of the appliance's SIM card.

Especially useful in those telecommunications networks where M2M connections have a different treatment than for user's subscriptions, the processing unit of the ILF server may be arranged for verifying that the appliance identifier of the appliance's SIM card corresponds to an M2M connection.

Furthermore, where the additional service is offered to the user for payment through a billing account of the user in the home telecommunication network of any charging derived from the usage of the appliance, the ILF server may be implemented so that the receiver is arranged for receiving a query from a billing function server of the home telecommunication network about a user's subscription associated with the appliance identified by the appliance identifier of the appliance's SIM card; the processing unit is arranged for retrieving the user's identifier of the user's SIM card associated with the appliance identifier of the appliance's SIM card; and the sender is arranged for providing the user's identifier of the user's SIM card to the billing function server.

In accordance with a third aspect of the present invention, there is provided an appliance configured to access an appliance media site for submitting information to be stored therein at disposal of an appliance's user.

This appliance comprises: a SIM card reader arranged to read an appliance identifier from an appliance's SIM card of a home telecommunication network; a setting unit for the user setting the appliance for association of the user with the appliance; a requestor, which is responsive to the user's setting, for requesting a token to the home telecommunication network for the association of the user with the appliance, the request including the appliance identifier of the appliance's SIM card; a receiver for receiving the token from the ILF server of the home telecommunication network; and a user's interface unit for presenting the token to the user.

In particular, the setting unit of the appliance may be arranged for the user selecting an option in the user's interface unit of the appliance for setting the appliance.

In accordance with a fourth aspect of the present invention, there is provided an appliance media site server, "AMS server", for storing appliance information and for servicing appliances' users.

This AMS server comprises: a user's interface unit for a user, who accesses the AMS server through a terminal equipment, registering a user name and password to initiate a user's account in the AMS server; a processing unit for creating the user's account with the username and password; the user's interface unit arranged for receiving an identifier of a home telecommunication network; a redirection unit for redirecting the user towards the home telecommunication network with information for further return, and for receiving the user back to the AMS server with an appliance identifier of an appliance's SIM card from the home telecommunication network; and the processing unit arranged for associating the appliance identifier of the appliance's SIM card with the user's account.

Aligned with a corresponding embodiment of the above method, the user's interface unit of the AMS server may be arranged for requesting the user to identify the home telecommunication network, upon the processing unit detecting there is no appliance identifier associated with the user's account.

Moreover, in order to appropriately charge any costs derived from the usage of the appliance, the AMS server may further comprise comprising a charging unit for generating a charging event incurred by at least one of: the appliance identifier of the appliance's SIM and the user's account.

Furthermore, where the additional service is offered to the user for payment through a billing account of the user in the home telecommunication network of any charging derived from the usage of the appliance, the AMS server may further comprise a sender for submitting the charging event with the appliance identifier of the appliance's SIM card towards the home telecommunication network.

Apart from that, and for practical reasons, the AMS server may further comprise storage for storing the appliance identifier of the appliance's SIM card associated with the user name and password per user's account basis.

On the other hand, the invention may be practised by a computer program, in accordance with a fifth aspect of the invention, the computer program being loadable into an internal memory of a computer with input and output units as well as with a processing unit, and comprising executable code adapted to carry out the above method steps. In particular, this executable code may be recorded in a carrier readable in the computer.

Furthermore, in accordance with a sixth aspect of the invention, there is provided a billing function server of the home telecommunication network, the billing function server being in charge of generating charging records for charging users with a user's subscription in the home telecommunication network, and comprising: a receiver for receiving from the AMS server a charging event with an appliance identifier of an appliance's SIM card; a query unit for querying the ILF server about a user's subscription associated with the appliance identifier of the appliance's SIM card; a receiver for receiving from the ILF server the user's identifier of the user's SIM card, the user's SIM card belonging to the home telecommunication network; and a processing unit for charging a user's charging record for the user identified by the user's identifier of the user's SIM card with the charging event received from the AMS server.

BRIEF DESCRIPTION OF THE DRAWINGS

The features, objects and advantages of the invention will become apparent by reading this description in conjunction with the accompanying drawings, in which.

DETAILED DESCRIPTION

Figure 7:
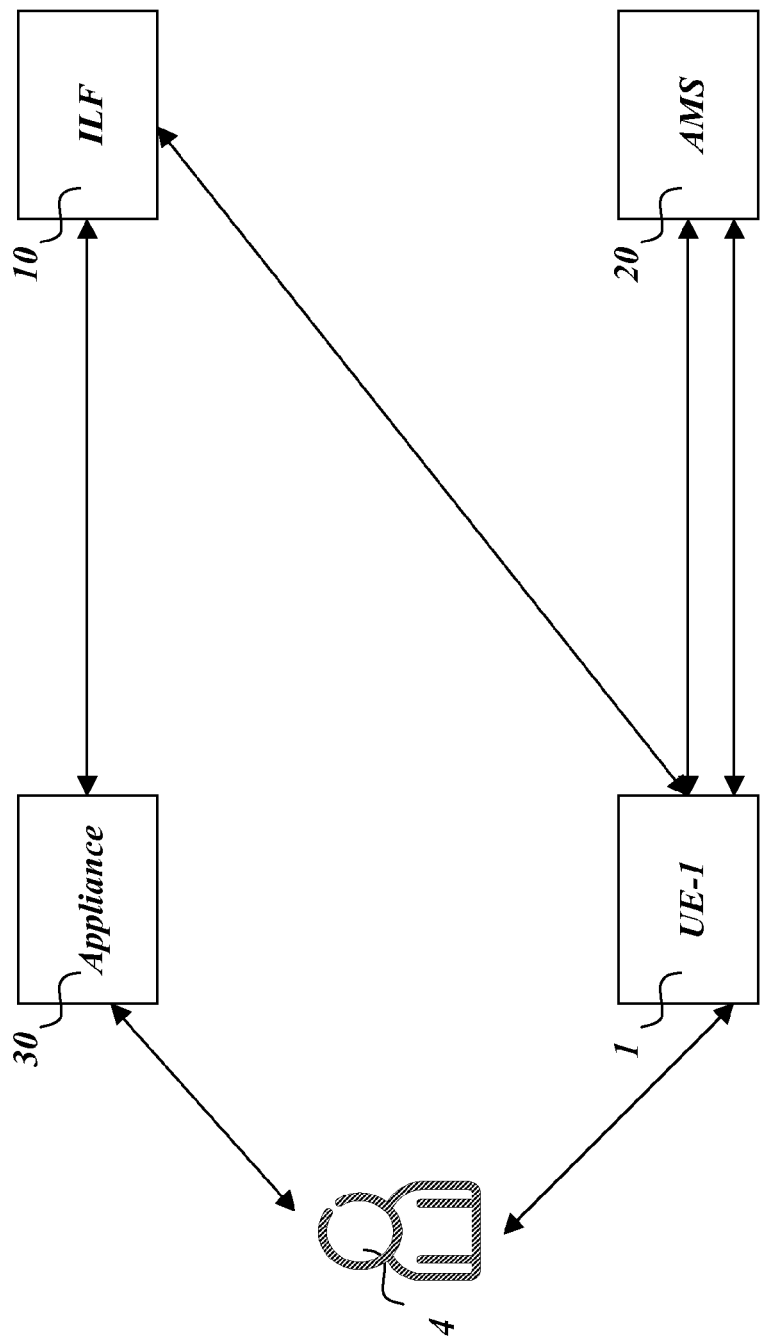
FIG. 7 illustrates a basic block diagram of the main entities involved in the present invention.

The following describes currently preferred embodiments of entities and method provided for in accordance with different aspects of the present invention. In particular, FIG. 7 shows the main entities involved and possible communication paths between them.

Figure 1A:
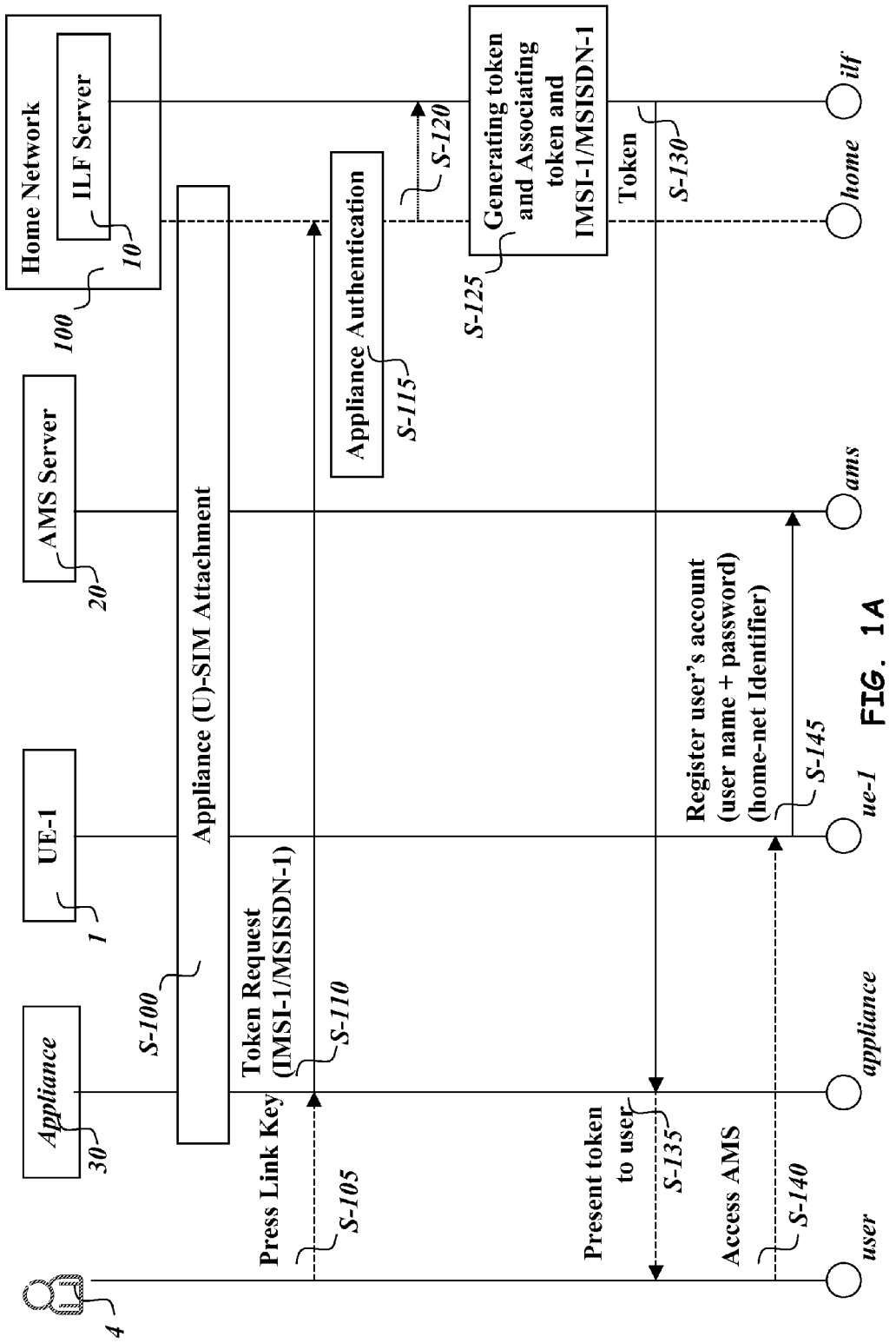
FIGS. 1A and 1B illustrate a simplified view of the sequence of actions to be performed in accordance with an aspect of the invention to carry out a method of associating an appliance with its user at respective appliance media site and home telecommunication network.
Figure 1B:
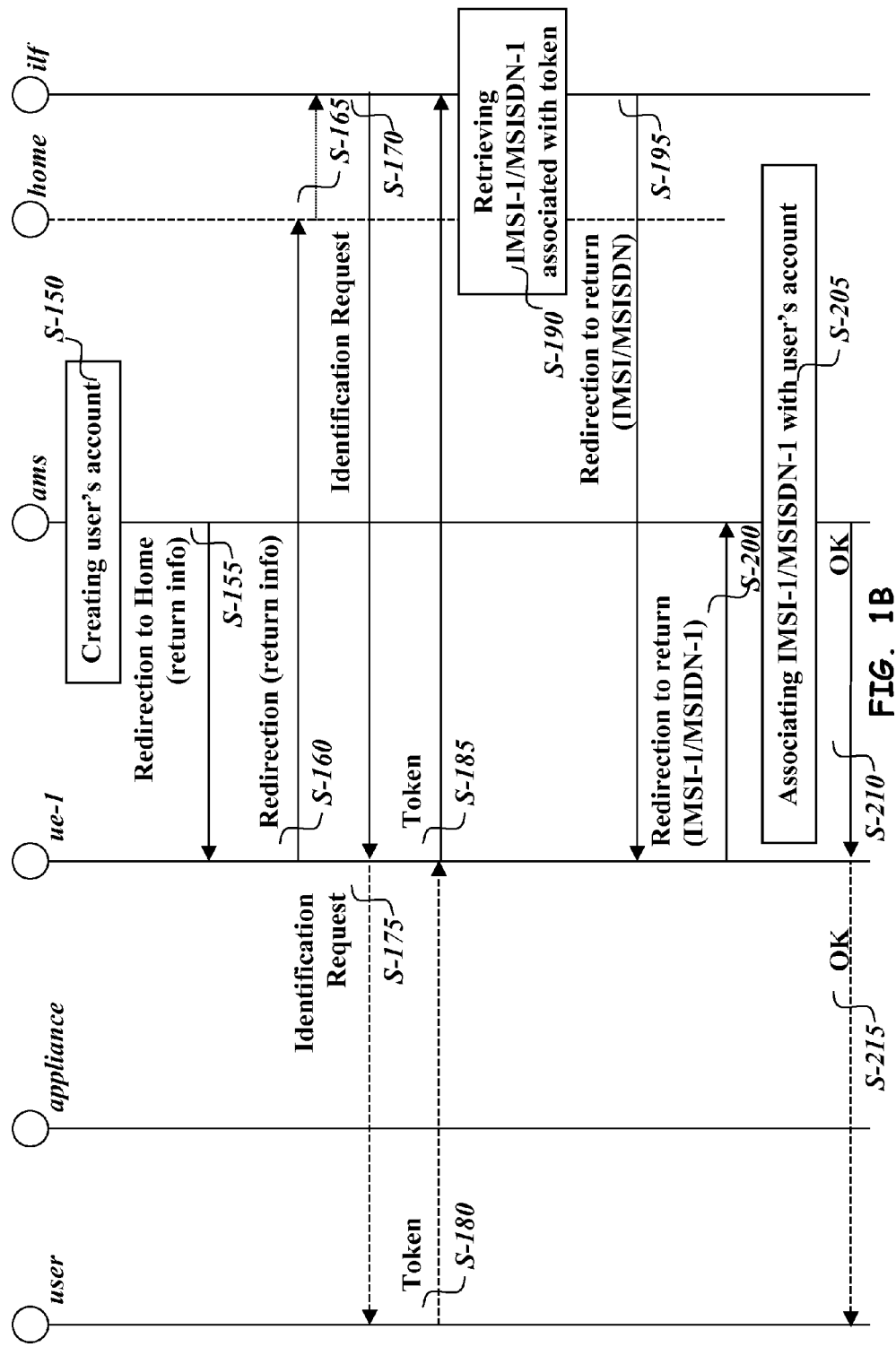

FIGS. 1A and 1B illustrate a method of associating an appliance with its user at respective appliance media site and home telecommunication network. As FIG. 1A illustrates, and once the user 4 has switched-on an appliance 30 equipped with an appliance's SIM card of a home telecommunication network 100, the method starts with a step S-100 of attaching the appliance 30 to the home telecommunication network.

Then, the user may set during a step S-105 the appliance in a mode for association of the user with the appliance. This may be carried out by simply pressing a sort of 'Link Key' of the appliance, or by selecting a particular corresponding option in a menu presented to the user by a user's interface unit of the appliance, or any equivalent input/output unit that the appliance might be equipped with for receiving commands from the user.

Responsive to the user's setting during the step S-105, the appliance requests during a step S-110 a token to the home telecommunications network for association of the appliance with the user. This request includes an appliance identifier of the appliance's SIM card, such as an IMSI, MSISDN, or both may be. For the sake of simplicity and better understanding of data relations, the appliance identifier of the appliance's SIM card may be any appliance identifier obtainable or readable from the appliance's SIM card, such as the IMSI or MSISDN may be; and the appliance identifier of the appliance's SIM card may thus be referred to hereinafter as IMSI-1/MSISDN-1 without any intention to restrict the scope of the invention to this sort of identifiers.

In an embodiment of the invention illustrated in FIG. 1A, this request for a token may be received in a suitable entity of the home telecommunication network 100 for carrying out an authentication procedure of the appliance during a step S-115; and then such entity forwards during a step S-120 the request to an Identity Linking Function server 10 "ILF server" of the home telecommunication network.

In other embodiment of the invention not explicitly illustrated in FIG. 1A, such request for a token may be directly submitted from the appliance to the ILF server 10.

More specifically, the ILF server 10 may provide an HTTP-based interface enabling the request for a token from the appliance. HTTP is proposed as transport protocol since the ILF server is expected to have a TCP/IP network connection. Accordingly, this HTTP-based interface may have a URL configured in the appliance. As already commented above, the access to this HTTP-based URL may trigger an authentication procedure so that an appliance identifier of the appliance's SIM card, such as IMSI-1/MSISDN-1, may be obtained.

Then, the ILF server 10 may generate the token and associate it with the appliance identifier of the appliance's SIM card, namely with the IMSI-1/MSISDN-1, during a step S-125. This token is unique during its life time, that is, whilst associated with an appliance identifier and even longer to avoid collisions with further associations. Once generated and associated with the appliance identifier, the ILF server submits the token to the appliance during a step S-130. In particular, as already commented above, the step of associating the token and the appliance identifier of the appliance's SIM card at the ILF server 10 may include a step of storing the token and the appliance identifier of the appliance's SIM card in a storage 11 accessible to the ILF server.

Upon receiving the token at the appliance 30, the token is presented to the user through a user's interface unit of the appliance during a step S-135, which in particular may be a graphic user interface (hereinafter GUI) of the appliance. The user might simply learn by heart the token or notice it in a piece of paper for further use. Alternatively, the appliance might retain such token in a memory or internal storage for further use. This is quite dependent on the appliance capabilities which might be different for different appliances models and trades.

The user may now make use of a first terminal equipment 1 (hereinafter UE-1) for accessing during a step S-140 an appliance media site server 20 "AMS server". In particular, this first terminal equipment may be a personal computer (PC), a laptop or a smart phone. Upon accessing the AMS server 20, the user may register during a step S-145 a user name and password to initiate a user's account in the AMS server.

Then, as illustrated in FIG. 1B, the AMS server 20 creates a user's account for the user at the AMS server during a step S-150.

In an embodiment of the invention, the user may provide along with the user name and password to create the user's account an identifier of a home telecommunication network where the appliance's SIM card belongs to. In another embodiment of the invention, the AMS server 20, upon detecting there is no appliance associated yet with the user's account, may request the user to provide such identifier of the home telecommunication network where the appliance's SIM card belongs to.

Once the home telecommunication network where the appliance's SIM card belongs to is known, the AMS server redirects during the steps S-155 and S-160 the user through the first terminal equipment 1 (UE-1) towards the home telecommunication network with information for further return.

To this end, the AMS server 20 may know in advance a list of network operators, which the AMS server has an agreement with, and necessary information to access particular entities in each home telecommunication operator network, such as a respective URL. This redirection is usually a HTTP redirection and may include, at least, information for further return once the procedures at the home telecommunication network have finished.

Upon redirection to the home telecommunication network during the step S-160, different embodiments are provided for. In one embodiment, the redirection is not directly received at the ILF server 10 but in a different entity of the home telecommunication network 100, which forwards the redirection message to the ILF server 10 during a step S-165. In another embodiment, where the URL stored at the AMS server 20 corresponds to the ILF server of the home telecommunications network 100, the redirection to the home telecommunication network during the step S-160 may directly reach the ILF server.

On the other hand, the dialogue between the AMS server 20 and the entity of the home telecommunication network, being the ILF server 10 or another, should preferably guarantee non repudiation, data integrity and confidentiality. For such purpose any suitable protocol, such as SAML v2.0, may be used.

The ILF server 10 then requests during a step S-170 user identification to the first terminal equipment 1 (UE-1), which presents such request to the user during a step S-175. The user provides during a step S-180 the token as user's identification, and the first terminal equipment 1 submits during a step S-185 the token as user's identification to the ILF server.

Upon receipt of the token, the ILF server 10 retrieves during a step S-190 the appliance identifier of the appliance's SIM card, namely IMSI-1/MSISDN-1, associated with the token, and the ILF server redirects during the steps S-195 and S-200 the user through the first terminal equipment back to the AMS server 20 with the retrieved appliance identifier of the appliance's SIM card. To this end, the ILF server makes use of the information for further return received in the redirection from the AMS server.

More specifically, the ILF server may provide a web interface to allow a human user equipped with a web browser to introduce a text string, such as the token. This web form may have a specific URL previously agreed with the AMS server. The invocation of this URL may include as parameter a back-URL, that is, the URL where the user is to be sent back once the verification of the token is carried out. The web form may be submitted to a URL where the ILF server can extract said text string and the back-URL.

Upon extraction of the string, the ILF server may verify its format and may query its accessible storage to determine whether there is a record with the token as key. If so, the rest of associated elements of the record will be retrieved, such as the exemplary IMSI-1/MSISDN-1 may be.

As response to the user request, namely to the submission of the web form, the ILF server may build an HTTP-based URL that can be delivered to the user as an HTTP redirect message, so that the user may be sent back to the AMS server. This URL may be the back-URL provided in the initial request with some attributes appended. The format is not relevant, but the appliance identifier IMSI-1/MSISDN-1 is included as a mandatory attribute. Besides, a digital signature on the appliance IMSI-1/MSISDN-1 may also be included, by using an asymmetric private key, and a digital certificate for the ILF server might have been previously shared.

Upon redirection back to the AMS server, the AMS server associates during a step S-205 the appliance identifier of the appliance's SIM card, received with the redirection message, with the user's account in the appliance media site server. Eventually, the AMS server might submit during a step S-210 a successful result indication towards the first terminal equipment 1 and the latter presents such successful result to the user 4.

Once the AMS server has associated the appliance identifier of the appliance's SIM card with the user's account, the user may start to make use of the user's account. For example, where the appliance is a camera, the user might start to upload pictures, and later edit the pictures at the AMS server via his laptop, if the latter were the terminal equipment.

In order to carry out the above method described with reference to FIGS. 1A and 1B, the present invention provides for an ILF server 10 illustrated in FIG. 4, an appliance 30 illustrated in FIG. 5 and an AMS server 20 illustrated in FIG. 6.

Figure 4:
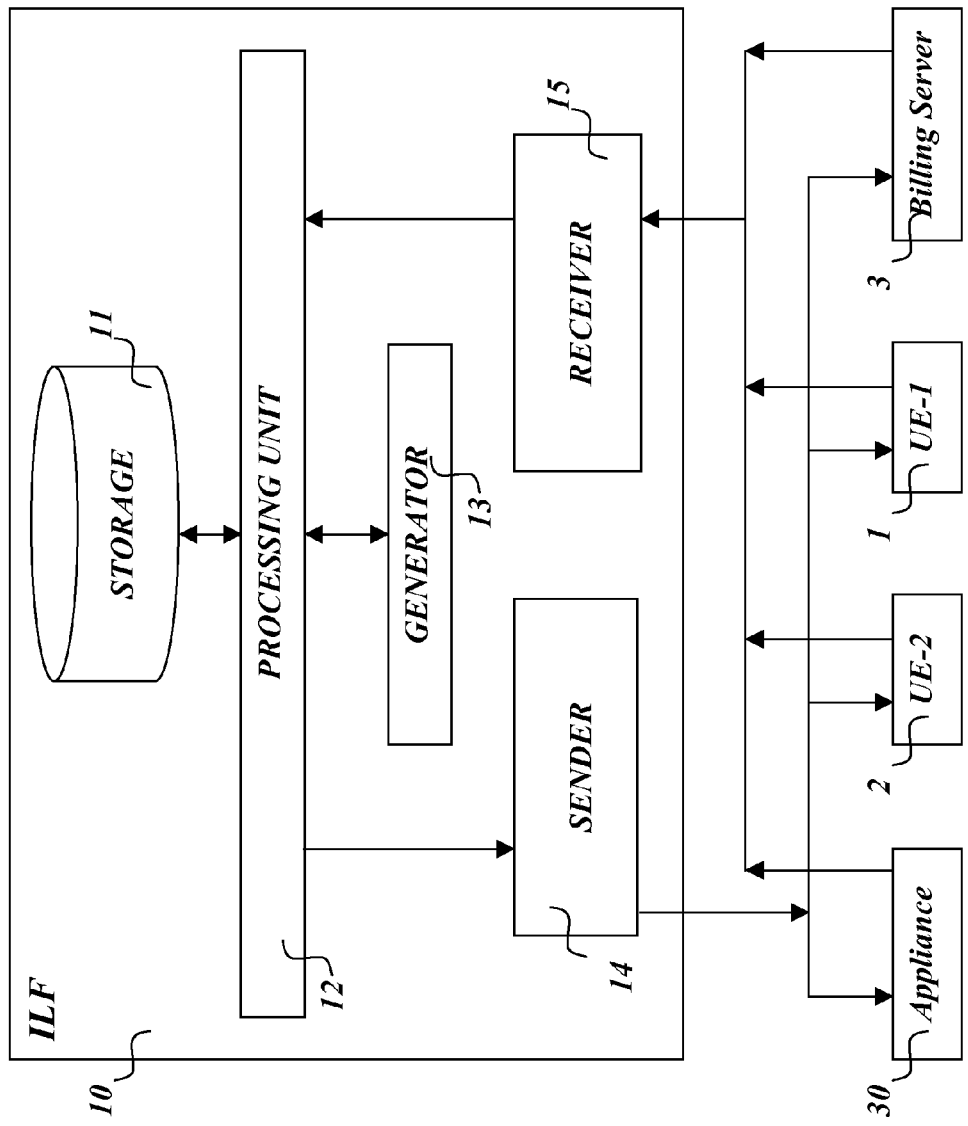
FIG. 4 basically represents structural components of an ILF server in accordance with an aspect of the invention.

The ILF server 10, as illustrated in FIG. 4, comprises a receiver 15 for receiving a request from an appliance 30 requesting a token for association of the user with the appliance, wherein the appliance is equipped with an appliance's SIM card of the home telecommunication network 100, and wherein the request includes an appliance identifier of the appliance's SIM card, namely the IMSI-1/MSISDN-1.

Still with reference to FIG. 4, the ILF server 10 comprises a generator 13 for generating the token; a processing unit 12 for associating the token with the appliance identifier of the appliance's SIM card; and a sender 14 for providing the token to the appliance. Apart from that, the receiver 15 of the ILF server 10 is arranged for receiving through the first terminal equipment in use by the user the token as user's identification, along with information indicating a return redirection; the processing unit 12 is arranged for retrieving the appliance identifier of the appliance's SIM card associated with the token; and the sender 14 is arranged for using the information indicating the return redirection for redirecting the user with the retrieved appliance identifier of the appliance's SIM card towards the return redirection, which addresses the AMS server 20. In particular, this ILF server 10 may comprise an accessible storage 11 for storing the token and the appliance identifier of the appliance's SIM card.

Figure 5:
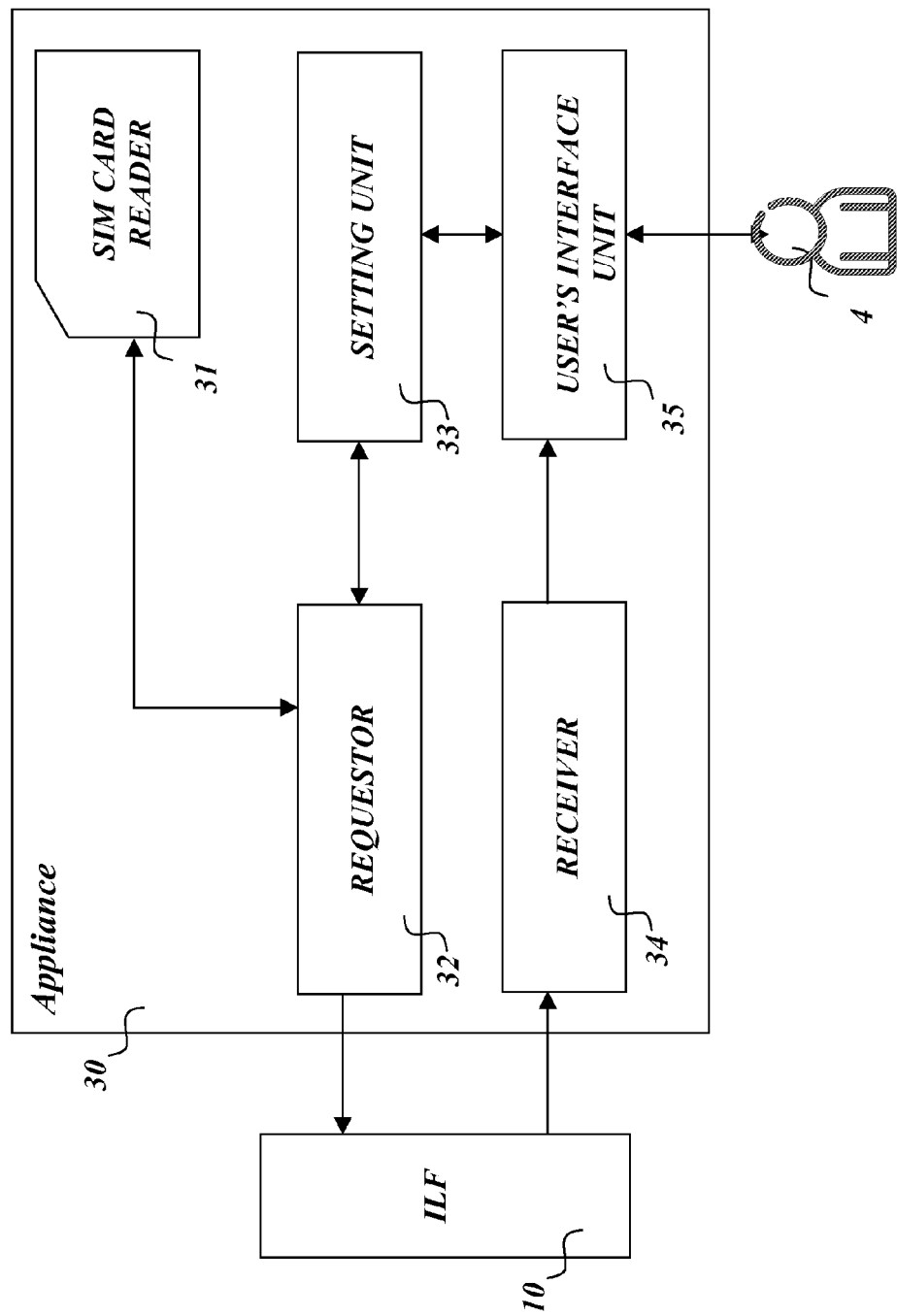
FIG. 5 basically represents structural components of an appliance, with an appliance SIM card of a home telecommunication network, in accordance with an aspect of the invention.

The appliance 30, as illustrated in FIG. 5, comprises a SIM card reader 31 arranged to read an appliance identifier, namely an IMSI-1/MSISDN-1, from the appliance's SIM card of the home telecommunication network 100; a setting unit 33 for the user 4 setting the appliance for association of the user with the appliance; a requestor 32, which is responsive to the user's setting, for requesting the token to the home telecommunication network for the association of the user with the appliance, the request including the appliance identifier of the appliance's SIM card, which in particular may be the IMSI-1/MSISDN-1; a receiver 34 for receiving the token from the ILF 10 of the home telecommunication network 100; and a user's interface unit 35 for presenting the token to the user.

In particular, the setting unit 33 of the appliance 30 may be arranged for the user 4 selecting an option in the user's interface unit of the appliance for setting the appliance. Alternatively, the appliance 30 may include a 'Link Key' or any equivalent input unit as part of the setting unit 33 for the user setting the appliance in a mode for association of the user with the appliance.

In this appliance 30, the requestor 32 may hold an internal communication with the setting unit 33 for being aware of the user's setting, and also may hold an internal communication with the SIM card reader 31 in order to obtain the appliance identifier from the appliance's SIM card.

Figure 6:
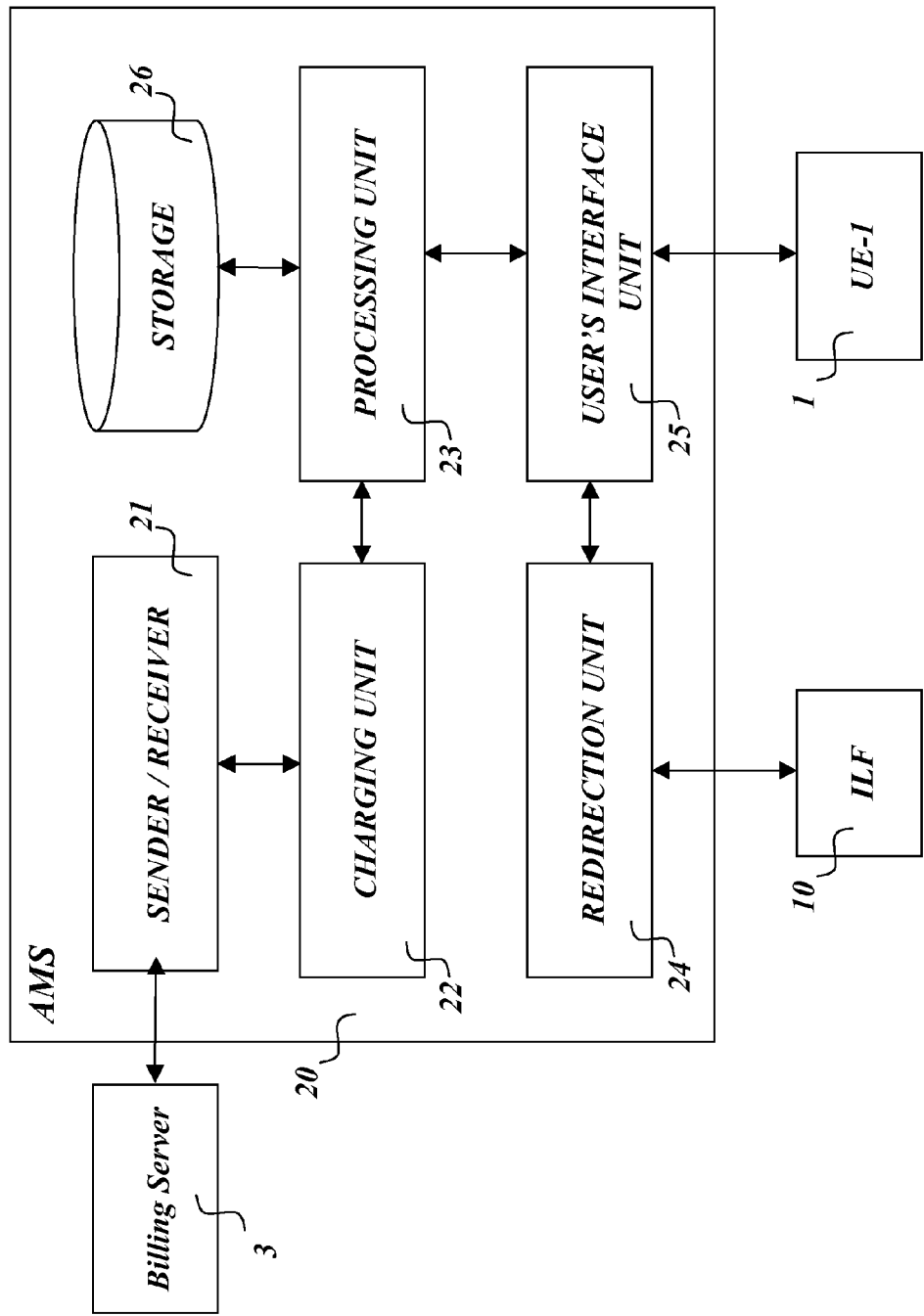
FIG. 6 basically represents structural components of an AMS server in accordance with an aspect of the invention.

The AMS server 20, as illustrated in FIG. 6, comprises a user's interface unit 25 for the user, who accesses the AMS server through a terminal equipment 1 (UE-1), registering a user name and password to initiate a user's account in the AMS server, and wherein this user's interface unit is arranged for receiving an identifier of a home telecommunication network 100, identifier which is provided from the user 4 through the terminal equipment 1.

The AMS server 20, exemplary illustrated in FIG. 6, also comprises a processing unit 23 for creating the user's account with the username and password; and a redirection unit 24 for redirecting the user towards the home telecommunication network with information for further return, and for receiving the user back to the AMS server with an appliance identifier of an appliance's SIM card from the home telecommunication network. This processing unit 23 is also arranged for associating the appliance identifier of the appliance's SIM card, as received at the redirection unit 24, with the user's account. In particular, the AMS server 20 may also comprise storage 26 for storing the appliance identifier of the appliance's SIM card associated with the user name and password per user's account basis.

In order to accomplish an alternative of the above method related with the submission by the user of the identifier of the home telecommunication network where the appliance's SIM card belongs to, the user's interface unit 25 of the AMS server 20 may be arranged for requesting the user 4 to identify the home telecommunication network 100, upon the processing unit 23 of the AMS server 20 detecting there is no appliance identifier associated with the user's account.

Back to the sequence of actions illustrated with reference to FIGS. 1A and 1B and, the present invention provides for alternative or complementary embodiments depending on the life-time of the token, as already discussed above, which influence further sequence of actions to be carried out for advantageously associating the appliance 30 with the user's subscription held in the home telecommunication network 100.

In accordance with a first token-related embodiment, upon the ILF server 10 redirecting during the steps S-195 and S-200 the user through the first terminal equipment back to the AMS server 20 with the retrieved appliance identifier of the appliance's SIM card, the method may include a further step, not illustrated in any drawing, of deleting the token and any association thereof from ILF server 10, so that any further association of the appliance with the user's subscription held in the home telecommunication network 100 cannot make use of such previously generated token. This embodiment is advantageous for security since the life-time of the token is limited to its original purpose of associating user and appliance, at least, at the AMS server.

In accordance with a second token-related embodiment, the step S-125 of generating the token at the ILF server may comprise a step, not illustrated in any drawing, of generating a time-stamp; and the step S-125 of associating the token and the appliance identifier of the appliance's SIM card may comprise a step of associating the time-stamp with the token and the appliance identifier of the appliance's SIM card at the ILF server 10. In this embodiment, upon expiry of the time-stamp, the method may further include a step, not illustrated in any drawing, of deleting the token and any association thereof from the ILF server 10. This second token-related embodiment may provide comparable advantages as for the above first token-related embodiment though allows keeping the token alive for a longer period so as to allow the user to still make use of it without needs for generating a new token.

Particularly for this purpose, the generator 13 of the ILF server 10 may be arranged for generating this time-stamp, and the processing unit 12 of the ILF server 10 may be arranged for associating the time-stamp with the token and the appliance identifier of the appliance's SIM card.

In particular, as already commented above, the step of associating the time-stamp with the token and the appliance identifier of the appliance's SIM card at the ILF server 10 may include a step of storing the token, the appliance identifier of the appliance's SIM card and the time-stamp in a storage 11 accessible to the ILF server 10.

Since additional advantages and services may be obtained by extending this method to further associate the appliance 30 with a user's subscription held in the home telecommunication network 100, there is a third token-related embodiment provided for, whereby the token survives until the association of the appliance with the user's subscription of the home telecommunication network has been completed.

Figure 2:
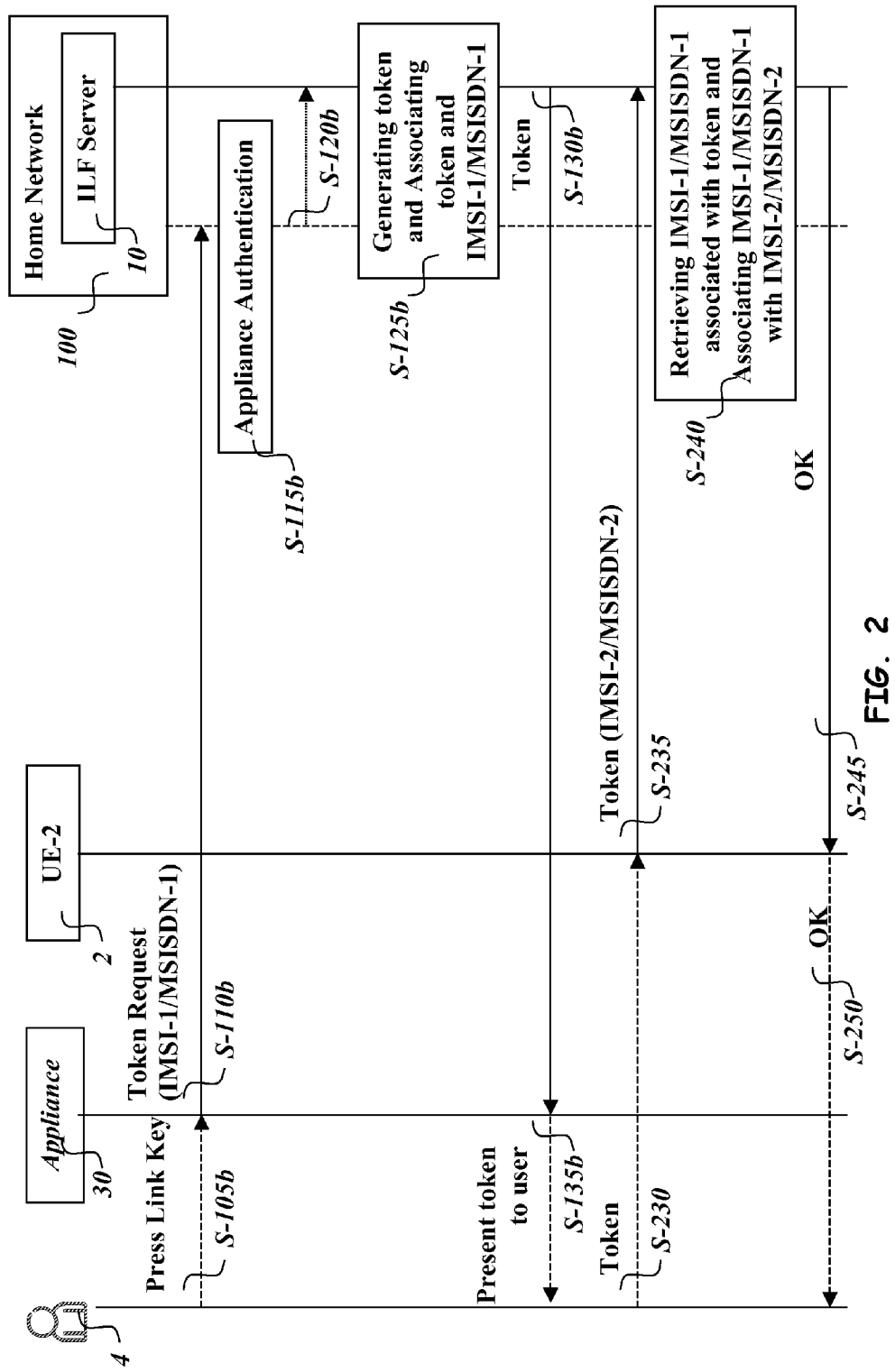
FIG. 2 shows a simplified view of the sequence of actions that can be carried out in accordance with an embodiment of the invention to associate the appliance with the user's subscription in the telecommunication network.

To this end, FIG. 2 illustrates the sequence of actions that can be carried out for associating the appliance with the user's subscription held in the home telecommunication network depending on whether the first, second or third token-related embodiment applies, so that the network operators can decide whether security reasons obtainable from the first or second token-related embodiments should prevail or the simple and soft workload of the third token-related embodiment should prevail.

As FIG. 2 shows, where the token has not survived, either because it was deleted under the first token-related embodiment or because the time-stamp has expired, there is a need for a new token to be used. To this end, as for the former token generation discussed above with reference to FIG. 1A and summarized in the following for this new token, the user may set during a step S-105*b* the appliance in a mode for association of the user with the appliance. This may be carried out by simply pressing a sort of 'Link Key' of the appliance, or by selecting a particular corresponding option in a menu presented to the user by a user's interface unit of the appliance, or any equivalent input/output unit that the appliance might be equipped with for receiving commands from the user.

Responsive to the user's setting during the step S-105*b*, the appliance requests during a step S-110*b* the new token to the home telecommunications network for association of the appliance with the user. This request includes an appliance identifier of the appliance's SIM card such as, for the sake of simplicity and without any intention to unnecessarily restrict the scope of the invention, the IMSI-1/MSISDN-1.

In particular, this request for a new token may be received in an intermediate entity of the home telecommunication network 100 for carrying out an authentication procedure of the appliance during a step S-115*b*; and then such entity forwarding the request to an ILF server 10 of the home telecommunication network during a step S-120*b*; or such request for a new token may be directly submitted from the appliance to the ILF server 10. The ILF server 10 may provide the HTTP-based interface enabling the request for the new token from the appliance as already discussed above with reference to the corresponding procedure for the former token illustrated in FIG. 1A.

In particular, where the request is received in the intermediate entity of the home telecommunication network, the ILF server may provide a SMPP-like protocol enabled to receive messages sent to a specific short code. More specifically, the intermediate entity may be configured so that when a message to corresponding B-number arrives, its format is adapted and it is sent to the ILF server by using SMPP, or other similar protocol. The message sent from the intermediate entity to the ILF server carries at least the payload of the original message and the A-number.

Then, the ILF server 10 may generate the new token and associate it with the appliance identifier of the appliance's SIM card, namely with the IMSI-1/MSISDN-1, during a step S-125*b*; and, once generated and associated with the appliance identifier, the ILF server may submit the token to the appliance during a step S-130*b*. In particular, as already commented above, the step of associating the token and the appliance identifier of the appliance's SIM card at the ILF server 10 may include a step of storing the token and the appliance identifier of the appliance's SIM card in a storage 11 accessible to the ILF server. Then, upon receiving the token at the appliance 30, the token may be presented to the user through a user's interface unit of the appliance during a step S-135*b*, and the new token being treated in a similar manner as the former token by the user 4 and the appliance 30.

On the other hand, where the token has survived, either under the third token-related embodiment or because the time-stamp has not expired yet, there is no need for a new token to be generated, and the sequence of actions S-105*b* to S-135*b* illustrated in FIG. 2 can be omitted.

That is, the user may submit during the steps S-230 and S-235 the current token, either the surviving token or the new token, to the home telecommunications network 10, through a second terminal equipment 2 (hereinafter UE-2), which is equipped with a user's SIM card of the home telecommunication network, the token being submitted along with a request for association of the appliance with a user's subscription corresponding to the user's SIM card, the request including a user's identifier of the user's SIM card. This second terminal equipment 2 (UE-2) may be a mobile phone, a laptop or personal computer (PC) directly equipped, or with physical support from another communication device, with a user's SIM card of the home telecommunication network 100. In particular, the user's identifier of the user's SIM card may be an IMSI, MSISDN, or both user's identifiers obtainable or readable from the user's SIM card; although other identifiers obtainable or readable from the user's SIM card might also be possible for the purpose of the present invention. For the sake of simplicity and better understanding of data relations, the user's identifier of the user's SIM card may be referred to hereinafter as IMSI-2/MSISDN-2 without any intention to restrict the scope of the invention to this sort of identifiers.

Generally speaking, this second terminal equipment 2 (UE-2) may be the same terminal equipment as the above first terminal equipment 1 (UE-1), where the latter is equipped with the user's SIM card of the home telecommunication network 100.

In an embodiment of the invention not illustrated in any drawing, this request may be submitted to an entity of the telecommunication network 100, and the latter may forward this request to the ILF server 10. In the embodiment illustrated in FIG. 2, the ILF server 10 receives this request from the second terminal equipment 2 (UE-2) during a step S-235.

Upon receipt of this request for association of the appliance with the user's subscription, the ILF server may retrieve during a step S-240 the appliance identifier of the appliance's SIM card associated with the token, may associate the received user's identifier of the user's SIM card with the appliance identifier of the appliance's SIM card, and may confirm back to the user 3 during steps S-245 and S-250 the association of the appliance and the user's subscription.

Since, one the one hand, the appliance 30 and the user's account at the AMS server 20 have already been associated and, on the other hand, the appliance 30 and the user's subscription at the home telecommunication network 100 have also been associated, the method may include a further step, not illustrated in any drawing, of deleting the token (the previous or the newer, where applicable) and any association thereof from the ILF server 10.

In order to carry out the association of the appliance and the user's subscription at the home telecommunication network, the receiver 15 of the ILF server 10 may be arranged for receiving the token from the user, through the terminal equipment 2 with a user's SIM card of the home telecommunication network 100, along with a request for association of the appliance with a user's subscription corresponding to the user's SIM card, the request including a user's identifier of the user's SIM card, which may exemplary be the IMSI-2/MSISDN-2; the processing unit 12 of the ILF server 10 may be arranged for retrieving the appliance identifier of the appliance's SIM card associated with the token, namely the IMSI-1/MSISDN-1, and for associating the user's identifier of the user's SIM card with the appliance identifier of the appliance's SIM card, that is, the IMSI-2/MSISDN-2 with the IMSI-1/MSISDN-1; and the sender 14 of the ILF server 10 may be arranged for confirming back to the user the association of the appliance and the user's subscription.

At any time, the ILF server 10 may carry out a step of verifying whether the appliance identifier of the appliance's SIM card corresponds to a Machine-to-Machine "M2M" connection. This may be advantageous where special rates and tariffs are applied in the telecommunication network for this sort of connections, or in order to verify the appropriate use of services or resources involved in this method. To this end, the processing unit 12 of the ILF server 10 may be arranged for verifying that the appliance identifier of the appliance's SIM card corresponds to an M2M connection.

Bearing this in mind, the present invention further provides for the additional service offered to the user for payment through a billing account of the user in the home telecommunication network 100 of any charging derived from the usage of the appliance 30 or of the user's account. For example, where pictures are upload, download or edited at the AMS server, or when the size of storage for the user's account is increased at the AMS server, or whatever other activities requiring a payment by the user.

Figure 3:
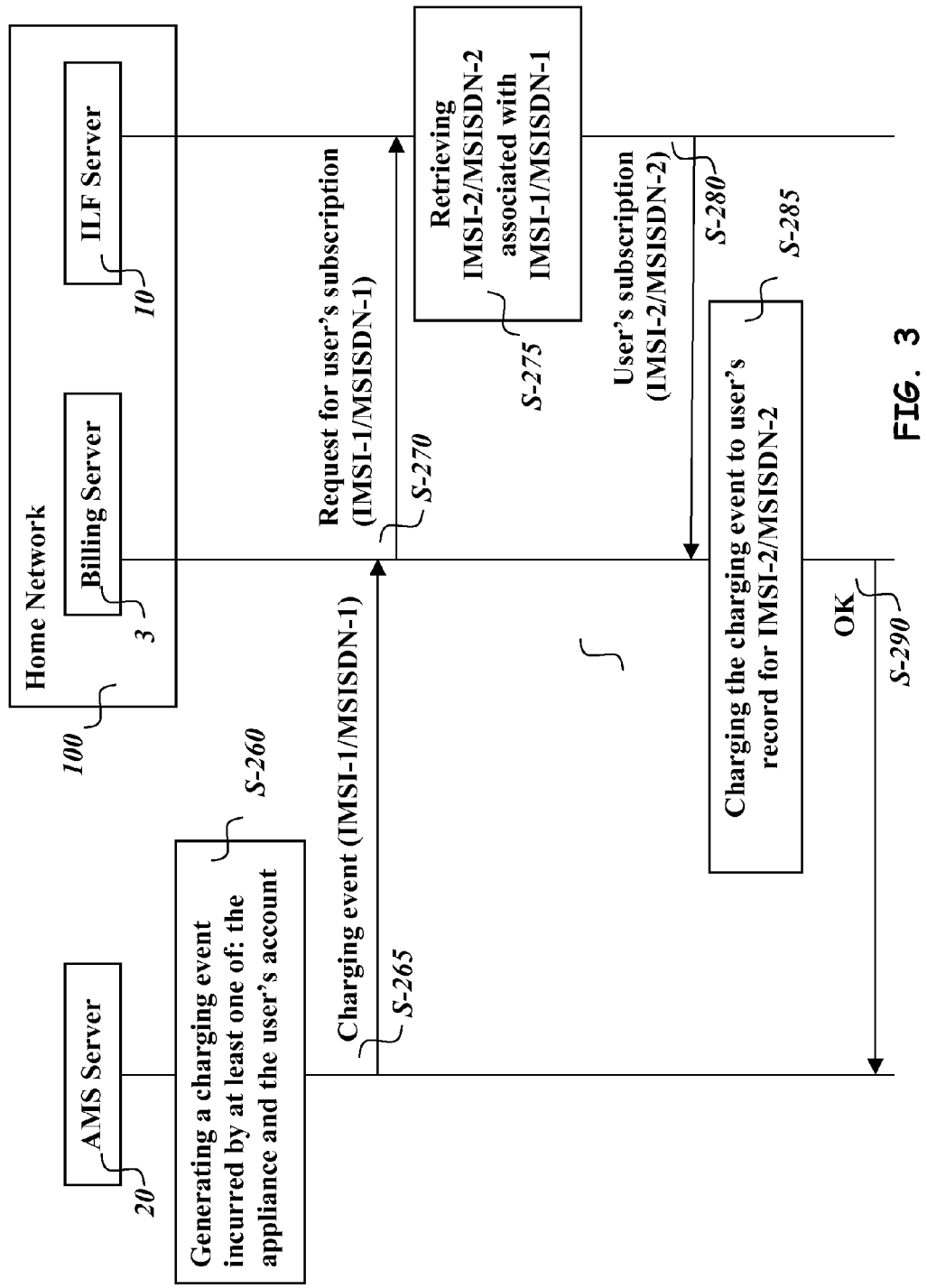
FIG. 3 shows a simplified view of the sequence of actions that can be carried out in accordance with an embodiment of the invention to charge through a billing account of the user in the home telecommunication network any charging derived from the usage of the appliance.

As illustrated in FIG. 3, the AMS server may generate during a step S-260 a charging event incurred by activities carried out by the appliance 30, or by activities of the user through his or her user's account, or by both. Then, the AMS server 20 may submit during a step S-265 this charging event towards the home telecommunication network 100, and this charging event being submitted with the appliance identifier of the appliance's SIM card associated with the user's account at the AMS server 20. The AMS server may submit the charging event by using an ad hoc Representational State Transfer "REST"-based protocol or taking advantage of Diameter CCA (Credit-Control Application).

A billing function server 3 of the home telecommunication network 100, upon receipt of the charging event along with the appliance identifier of the appliance's SIM card, may query the ILF server 10 during a step S-270 about a user's subscription associated with the appliance identifier of the appliance's SIM card.

The ILF server 10 may then retrieve during the step S-275 the user's identifier of the user's SIM card, which is associated with the appliance identifier of the appliance's SIM card, and may provide during a step S-280 said user's identifier of the user's SIM card to the billing function server 3 as response to the query.

The billing function server 30 receiving such response to the query may charge during a step S-285 a user's charging record for the user identified by the user's identifier of the user's SIM card with the charging event received from the AMS server.

To this end, the ILF server 10 may be implemented so that the receiver 15 is arranged for receiving the query from the billing function server 3 of the home telecommunication network 100 about a user's subscription associated with the appliance identified by the appliance identifier of the appliance's SIM card; the processing unit 12 is arranged for retrieving the user's identifier of the user's SIM card, exemplary the IMSI-2/MSISDN-2, associated with the appliance identifier of the appliance's SIM card, exemplary the IMSI-1/MSISDN-1; and the sender 14 is arranged for providing the user's identifier of the user's SIM card to the billing function server 30.

Also to this end, the AMS server 20 may further comprise a charging unit 22 for generating a charging event incurred by at least one of: the appliance identifier of the appliance's SIM and the user's account. And, where the corresponding payment for this charging event is preferably to be consolidated with a billing account of the user at the home telecommunication network, the AMS server 20 may further comprise a sender 21 for submitting the charging event with the appliance identifier of the appliance's SIM card towards the home telecommunication network. In addition, the AMS server may also comprise a receiver 21 for receiving an acknowledge from the home telecommunication network indicating that the corresponding payment for this charging event is preferably has been consolidated with a billing account of the user at the home telecommunication network. In particular, this sender and receiver of the AMS server 20 may be provided as an integral sender/receiver unit 21 or as separate units.

Still to this end, there is provided a billing function server 3 of the home telecommunication network 100, the billing function server being in charge of generating charging records for charging users with a user's subscription in the home telecommunication network, and comprising: a receiver for receiving from the AMS server 20 a charging event with an appliance identifier of an appliance's SIM card; a query unit for querying the ILF server 10 about a user's subscription associated with the appliance identifier of the appliance's SIM card; a receiver for receiving from the ILF server 10 the user's identifier of the user's SIM card, the user's SIM card belonging to the home telecommunication network; and a processing unit for charging a user's charging record for the user identified by the user's identifier of the user's SIM card with the charging event received from the AMS server 20.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of associating an appliance with an appliance user at a respective appliance media site and home telecommunication network upon the user switching on the appliance with an appliance SIM card of the home telecommunication network, the method comprising:
   attaching, by the appliance, to the home telecommunication network;
   entering, by the appliance, a setting mode;
   requesting, by the appliance, a token to the home telecommunication network, the request including an appliance identifier of the appliance SIM card;
   generating, by an Identity Linking Function server of the home telecommunication network, the token;
   associating, by the Identity Linking Function server, the token with the appliance identifier of the appliance SIM card;
   providing, by the Identity Linking Function server, the token to the appliance;
   receiving, by an appliance media site server, a user name and password from a terminal equipment;
   creating, by the appliance media site server, a user account with the received user name and password;
   receiving, by the appliance media site server from the terminal equipment, an identifier of the home telecommunication network;
   redirecting, by the appliance media site server, based on the received identifier, the terminal equipment to the home telecommunication network, the redirection comprising information for further return;
   receiving, by the Identity Linking Function server, the token from the terminal equipment;
   retrieving, by the Identity Linking Function server, the appliance identifier of the appliance SIM card associated with the token;
   redirecting, by the Identity Linking Function server, based on the information for further return, the terminal equipment to the appliance media site server with the retrieved appliance identifier of the appliance SIM card; and
   associating, by the appliance media site server, the appliance identifier of the appliance SIM card with the user account.

2. The method of claim 1, wherein entering a setting mode comprises receiving, by the appliance, a corresponding user option in a user interface unit of the appliance.

3. The method of claim 1, wherein submitting the identifier of the home telecommunication network to the appliance media site server is responsive to the appliance media site server receiving an identifier of the home telecommunication network, upon detecting there is no appliance associated with the user account in the appliance media site server.

4. The method of claim 1, wherein a single message comprises receiving the identifier of the home telecommunication network and receiving the user name and password.

5. The method of claim 1, wherein associating of the token and the appliance identifier of the appliance SIM card includes storing the token and the appliance identifier of the appliance SIM card in a storage accessible to the Identity Linking Function server.

6. The method of claim 1, wherein generating the token by the Identity Linking Function server comprises generating a time-stamp, and associating the token and the appliance identifier of the appliance SIM card comprises associating the time-stamp with the token and the appliance identifier of the appliance SIM card.

7. The method of claim 6, wherein the associating of the token, the appliance identifier of the appliance SIM card and the time stamp comprises storing the token, the appliance identifier of the appliance SIM card and the time-stamp in a storage accessible to the Identity Linking Function server.

8. The method of claim 6, further comprising, upon expiry of the time-stamp, deleting the token and any association thereof from the Identity Linking Function server.

9. The method of claim 1, further comprising verifying at the Identity Linking Function server whether the appliance identifier of the appliance SIM card corresponds to a Machine-to-Machine (M2M) connection.

10. The method of claim 1, wherein redirecting the terminal equipment to the appliance media site server includes deleting the token and any association thereof from the Identity Linking Function server.

11. The method of claim 10, further comprising:
    entering, by the appliance, a setting mode;
    requesting, by the appliance, a token to the home telecommunication network for the association of the user with the appliance, the request including an appliance identifier of the appliance SIM card;
    generating, by the Identity Linking Function server of the home telecommunication network, the token, associating the token and the appliance identifier of the appliance SIM card, and providing the token to the appliance;
    submitting, by a terminal equipment with a user SIM card of the home telecommunication network, the token to the home telecommunications network, along with a request for association of the appliance with a user subscription corresponding to the user SIM card, the request including a user identifier of the user SIM card; and
    retrieving, by the Identity Linking Function server, the appliance identifier of the appliance SIM card associated with the token, associating the user identifier of the user SIM card with the appliance identifier of the appliance SIM card, and sending, to the terminal equipment, a message confirming the association of the appliance with the user subscription.

12. The method of claim 1, further comprising:
    submitting, by a terminal equipment with a user SIM card of the home telecommunication network, the token to the home telecommunications network, along with a request for association of the appliance with a user subscription corresponding to the user SIM card, the request including a user identifier of the user SIM card; and
    retrieving, by the Identity Linking Function server, the appliance identifier of the appliance SIM card associated with the token, associating the user identifier of the user SIM card with the appliance identifier of the appliance SIM card, and sending, to the terminal equipment, a message confirming the association of the appliance with the user subscription.

13. The method of claim 12, further comprising deleting, by the Identity Linking Function server, the token and any association thereof from the Identity Linking Function server.

14. The method of claim 12, further comprising:
    submitting, by the appliance media site server, a charging event with the appliance identifier of the appliance SIM card to the home telecommunication network;
    querying, by a billing function server of the home telecommunication network, the Identity Linking Function server about a user subscription associated with the appliance identifier of the appliance SIM card;
    retrieving, by the Identity Linking Function server, the user identifier of the user SIM card associated with the appliance identifier of the appliance SIM card and providing the user identifier of the user SIM card to the billing function server; and charging, by the billing function server, a user charging record for the user identified by the user identifier of the user SIM card with the charging event received from the appliance media site server.

15. A system for associating an appliance with an appliance user at respective appliance media site and home telecommunication network, the system comprising:

an appliance comprising:
an appliance SIM card of the home telecommunication network;
an appliance processor; and
an appliance memory storing executable instructions that when executed by the appliance processor causes the appliance processor to perform the steps of:
attaching to the home telecommunication network;
entering a setting mode for association with the appliance user;
requesting a token to the home telecommunication network for the association with the appliance user, the request comprising an appliance identifier of the appliance SIM card;
receiving the token from an Identity Linking Function server of the home telecommunication network; and
presenting the token to the appliance user;
the Identity Linking Function (ILF) server of the home telecommunication network comprising:
an ILF server processor; and
an ILF server memory storing executable instructions that, when executed by the ILF server processor causes the ILF server processor to perform the steps of:
receiving a request from the appliance, the request requesting a token for the association of the appliance user with the appliance, and comprising an appliance identifier of the appliance SIM card;
generating the token, associating the token with the appliance identifier and providing the token to the appliance;
receiving, through a terminal equipment in use by the appliance user, the token as user identification, along with information that indicates a return redirection to an appliance media site (AMS) server;
retrieving the appliance identifier associated with the token; and
redirecting, based on the return redirection information received, the appliance user with the received appliance identifier towards the appliance media site (AMS) server;
the appliance media site (AMS) server comprising:
an AMS server processor; and
an AMS server memory storing executable instructions that, when executed by the AMS server processor causes the AMS server processor to perform the steps of:
receiving a user name and password from the terminal equipment;
creating a user account with a user name and password received from the terminal equipment;
receiving from the terminal equipment an identifier of the home telecommunication network;
redirecting the terminal equipment towards the home telecommunication network with information for further return;
receiving, upon return from the home telecommunication network, the appliance identifier of the appliance SIM card from the terminal equipment; and
associating the appliance identifier with the user account.

16. The system of claim 15, wherein entering the setting mode comprises selecting a corresponding option by the appliance user in a user interface unit of the appliance.

17. The system of claim 15, wherein the AMS server memory further comprises instructions that, when executed by the AMS server processor causes the AMS server processor to perform the steps of:
detecting there is no appliance identifier associated with the user's account; and
sending a request to the terminal equipment to identify the home telecommunication network.

18. The system of claim 15, wherein the AMS server memory further comprises instructions that, when executed by the AMS server processor causes the AMS server processor to perform the steps of:
receiving the identifier of the home telecommunication network; and
receiving the user name and password in a single message.

19. The system of claim 15, wherein the ILF server memory further comprises instructions that, when executed by the ILF server processor causes the ILF server processor to perform the step of storing the token and the appliance identifier in an accessible storage.

20. The system of claim 15, wherein the ILF server memory further comprises instructions that, when executed by the ILF server processor causes the ILF server processor to perform the steps of:
generating a time-stamp; and
associating the time-stamp with the token and the appliance identifier.

21. The system of claim 15, wherein the ILF server memory further comprises instructions that, when executed by the ILF server processor cause the ILF server processor to perform the steps of:
receiving the token from a terminal equipment with a user SIM card of the home telecommunication network along with a request for association of the appliance with a user subscription corresponding to the user SIM card, the request including a user identifier of the user SIM card;
retrieving the appliance identifier associated with the token;
associating the user identifier of the user SIM card with the appliance; and
sending, to the terminal equipment, a message confirming the association of the appliance with the user subscription.

22. The system of claim 21, wherein the ILF server memory further comprises instructions that, when executed by the ILF server processor cause the ILF server processor to perform the steps of:
receiving a query from a billing function server of the home telecommunication network about the user subscription associated with the appliance identifier;
retrieving the user identifier of the user SIM card associated with the appliance identifier; and
providing the user identifier of the user SIM card to the billing function server.

23. The system of claim 15, wherein the ILF server memory further comprises instructions that, when executed by the ILF server processor causes the ILF server processor to perform the step of verifying that the appliance identifier of the appliance's SIM card corresponds to a Machine-to-Machine connection.

24. The system of claim 15, wherein the AMS server memory further comprises instructions that, when executed by the AMS server processor causes the AMS server processor to perform the steps of:
   generating a charging event incurred by at least one of: the appliance identifier and the user account; and
   submitting the charging event with the appliance identifier towards the home telecommunication network.

25. The system of claim 15, wherein the AMS server memory further comprises instructions that, when executed by the AMS server processor causes the AMS server processor to perform the step of storing the appliance identifier associated with the user name and password.

\* \* \* \* \*